(12) United States Patent
Oohara et al.

(10) Patent No.: US 6,221,926 B1
(45) Date of Patent: Apr. 24, 2001

(54) EXPANDABLE POLYSTYRENE RESIN BEADS, PROCESS FOR THE PREPARATION OF THEM, AND FOAM MADE BY USING THE SAME

(75) Inventors: Hidekazu Oohara; Hidehiro Yamaguchi, both of Kobe; Kyoichi Nakamura, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/319,966

(22) PCT Filed: Dec. 11, 1997

(86) PCT No.: PCT/JP97/04555

§ 371 Date: Jun. 14, 1999

§ 102(e) Date: Jun. 14, 1999

(87) PCT Pub. No.: WO98/29485

PCT Pub. Date: Jul. 9, 1998

(30) Foreign Application Priority Data

Dec. 26, 1996 (JP) .................................... 8-357675

(51) Int. Cl.$^7$ ........................................ C08J 9/18
(52) U.S. Cl. ........................ 521/59; 521/56; 521/57; 521/60; 521/53; 521/139; 521/140; 521/54
(58) Field of Search .............................. 521/59, 139, 140, 521/56, 60, 53, 54

(56) References Cited

U.S. PATENT DOCUMENTS

| | | | |
|---|---|---|---|
| 4,409,338 | * | 10/1983 | DuGiulio ................. 521/59 |
| 5,525,636 | * | 6/1996 | Henn et al. ............... 521/59 |
| 5,525,637 | * | 6/1996 | Henn et al. ............... 521/59 |
| 5,661,191 | * | 8/1997 | Haraguchi et al. ........ 521/59 |
| 5,880,166 | * | 3/1999 | Gluck et al. .............. 521/59 |

FOREIGN PATENT DOCUMENTS

| | | |
|---|---|---|
| 52-33678 | 8/1977 | (JP) . |
| 56-673344 | 6/1981 | (JP) . |
| 67344 | 6/1981 | (JP) . |
| 116227 | 5/1993 | (JP) . |
| 51166227 | 5/1993 | (JP) . |
| 6-49263 | 2/1994 | (JP) . |
| 8188669 | 7/1996 | (JP) . |
| 245822 | 9/1996 | (JP) . |
| 8245822 | 9/1996 | (JP) . |

* cited by examiner

*Primary Examiner*—Morton Foelak
(74) *Attorney, Agent, or Firm*—Leydig, Voit & Mayer, Ltd.

(57) ABSTRACT

Foamable modified polystyrene resin particles (E) comprising a particle of a modified polystyrene resin (C) containing a blowing agent (D), wherein the modified polystyrene resin (C) comprises conjugated diene polymer rubber particles (B) dispersed uniformly throughout a polystyrene resin (A) and when the foamable modified polystyrene resin particle (E) is expanded, there is substantially no deformation of the rubber particles (B) before and after the expansion. A foamed article of a modified polystyrene resin which has a cell membrane of the modified polystyrene resin comprising a polystyrene resin and conjugated diene polymer rubber particles dispersed uniformly throughout the polystyrene resin and has a fusion rate of not less than 50%, wherein the rubber particles maintain substantially spherical form in the cell membrane. According to the present invention, the foamed article of the modified polystyrene resin having break resistance and fusion rate which are equal to those of a high impact polystyrene foamed article can be provided at low cost.

15 Claims, 9 Drawing Sheets

0.5μm 0.5μm 0.5μm

A 0.5μm 0.5 μm 2.0μm 1.0 μm

EXPANDABLE POLYSTYRENE RESIN BEADS, PROCESS FOR THE PREPARATION OF THEM, AND FOAM MADE BY USING THE SAME

TECHNICAL FIELD

The present invention relates to foamable modified polystyrene resin particles, a process for preparation thereof and a foamed article which is produced by using the foamable modified polystyrene resin particles and has excellent break resistance.

BACKGROUND ART

It is well known that a foamed article produced by expanding foamable polystyrene resin particles obtained by impregnating polystyrene resin particles with a blowing agent is broken easily. To improve such a defect, there has been proposed a process for mechanically blending a styrene-butadiene block copolymer with a polystyrene resin (cf. JP-B-47-17465 and JP-A-54-158467) and a process employing particles of a resin which is excellent in impact strength and so-called high impact polystyrene resin (HIPS), wherein the particles are prepared by polymerizing a styrene monomer in the presence of conjugated diene polymer particles (JP-B-47-18428 and JP-A-7-90105).

However it is necessary for those foamable polystyrene resin particles to be subjected to pelletizing through extrusion molding, which results in increase in cost. Further in commercially available high impact polystyrene resin, a molecular weight of its polystyrene cannot increase beyond a certain level.

JP-A-6-49263 discloses foamable polystyrene resin particles prepared by impregnating polystyrene resin particles with a mixture obtained by adding a polymerization initiator to a monomer mixture of a styrene monomer and conjugated diene monomer, polymerizing the monomer mixture to give polystyrene resin particles containing the obtained copolymer rubber particles gathering densely around the surface portion of the resin particle, and then impregnating the polystyrene resin particles with a blowing agent. Also it is disclosed that the center portion of the foamable resin particle is rich with polystyrene and, since the blowing agent is kept in the center portion, the resin particles having high expansion ratio can be obtained. Further, it is described that the resin before impregnated with the blowing agent has impact resistance.

The process mentioned above does not require a pelletizing step and is excellent from the viewpoint of cost. However the obtained foamed article, particularly the foamed article produced by molding pre-expanded particles within a mold is low in percentage of fused particles (fusion rate) and is insufficient in break resistance (in impact strength by a falling weight method).

An object of the present invention is to provide foamable modified polystyrene resin particles which can be prepared without being subjected to pelletizing and give a foamed article having excellent break resistance and high fusion rate; a process for preparation thereof; and a foamed article produced by expansion-molding the foamable modified polystyrene resin particles.

DISCLOSURE OF THE INVENTION

The present invention relates to foamable modified polystyrene resin particles, wherein the foamable modified polystyrene resin particle (E) comprises a particle of a modified polystyrene resin (C) containing a blowing agent (D); said resin (C) comprises conjugated diene polymer rubber particles (B) dispersed uniformly throughout a polystyrene resin (A) and when said foamable modified polystyrene resin particle (E) is expanded, there is substantially no deformation of the rubber particles (B) before and after the expansion Further the present invention relates to foamable modified polystyrene resin particles, wherein the foamable modified polystyrene resin particle comprises modified polystyrene resin particle containing a blowing agent; said modified polystyrene resin particle being prepared by polymerizing a conjugated diene monomer or a monomer mixture of the conjugated diene monomer and other monomer in polystyrene resin particle to form rubber particles of the conjugated diene polymer dispersed uniformly in the polystyrene resin particle and subjecting the obtained polystyrene resin particle containing the rubber particles to impregnation polymerization of a styrene monomer.

Still further the present invention relates to foamable modified polystyrene resin particles, wherein the foamable modified polystyrene resin particle (E) comprises a particle of modified polystyrene resin (C) containing a blowing agent (D);

said resin (C) comprises conjugated diene polymer rubber particles (B) dispersed uniformly throughout a polystyrene resin (A), an Izod impact strength of said modified polystyrene resin (C) is from 1 to 5 kg·cm/cm, a fusion rate between expanded particles of a foamed article (F) obtained by expansion-molding said foamable modified polystyrene resin particles (E) is not less than 50%, and a 50% failure height according to falling weight method of the foamed article (F) is from 1.35 to 1.84, when a 50% failure height according to falling weight method of a foamed article (H) obtained by expansion-molding a foamable polystyrene resin particle (G) which comprises the polystyrene resin (A) containing a blowing agent (D) is 1.

Such foamable modified polystyrene resin particles of the present invention can be obtained by:

polymerizing a conjugated diene monomer or a monomer mixture of the conjugated diene monomer and other monomer in polystyrene resin particle to form rubber particles of the conjugated diene polymer uniformly dispersed in the polystyrene resin particle, subjecting the obtained polystyrene resin particles containing the rubber particles to impregnation polymerization of a styrene monomer to give a modified polystyrene resin particle, and impregnating the modified polystyrene resin particle with a blowing agent.

As the polystyrene resin particle, there can be used one which contains 0.001 to 1.0% (% by weight, hereinafter the same) of a nucleating agent and has a concentration of the nucleating agent in the surface neighborhood of the polystyrene resin particle which is lower than that of the nucleating agent in the inside portion of the polystyrene resin particle. The nucleating agent-containing polystyrene resin particles can be obtained by a process, wherein the polystyrene resin particles are prepared by suspending polystyrene resin seed particles in an aqueous dispersion medium, adding a styrene monomer in the aqueous dispersion medium continuously or intermittently and polymerizing with impregnating the seed particles with the styrene monomer, characterized in that the whole or a part of 0.001 to 1 part (part by weight, hereinafter the same) of the nucleating agent to be contained in 100 parts of the finally obtained polystyrene resin particles is present in the seed particles at a stage prior to addition of the styrene monomer.

Also the present invention relates to a foamed article of a modified polystyrene resin which has a cell membrane of the modified polystyrene resin comprising a polystyrene resin and conjugated diene polymer rubber particles dispersed uniformly in the polystyrene resin, wherein a fusion rate is not less than 50% and the rubber particles maintain substantially their spherical form in the cell membrane.

The foamed article can be obtained by expansion-molding the above-mentioned foamable modified polystyrene resin particles.

In this specification, the foamed article includes both pre-expanded particles obtained by expanding foamable resin particles mentioned hereinafter and a molded article obtained by molding the pre-expanded particles within a mold (hereinafter referred to as "in-mold molding"). The foamed article represents both unless otherwise noted.

BEST MODE FOR CARRYING OUT THE INVENTION

Figure 1:
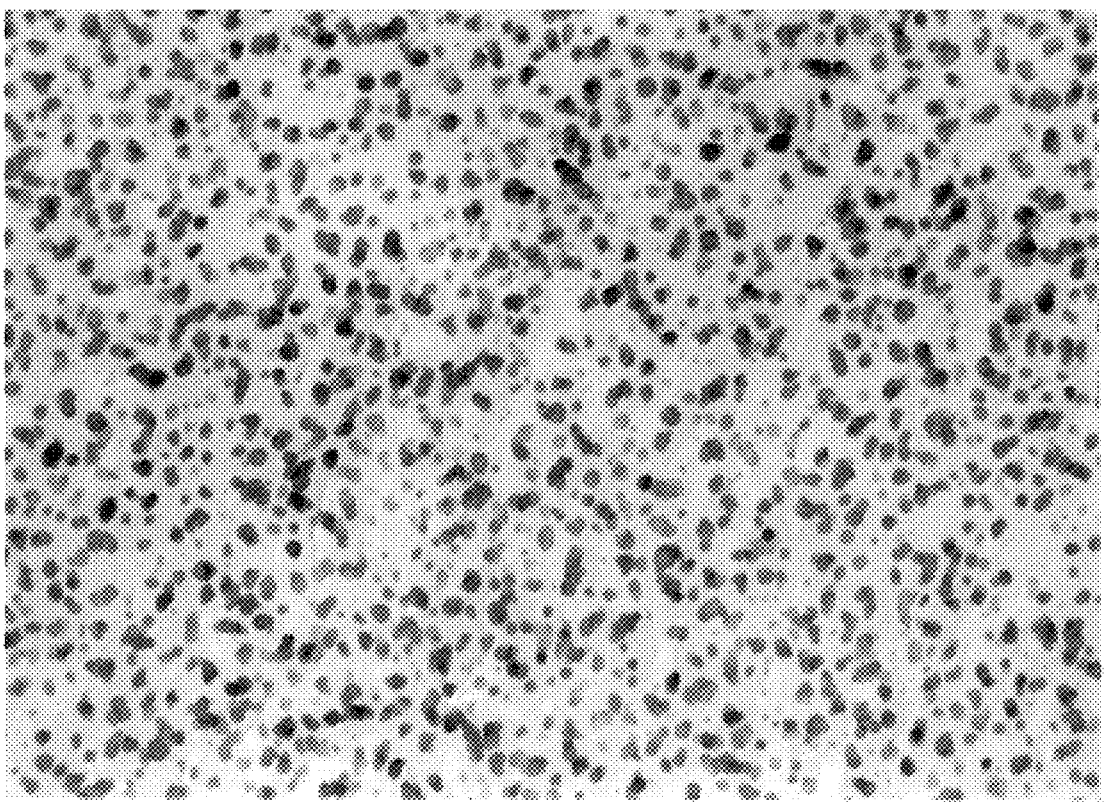
FIG. 1 is a photograph of a transmission electron microscope (TEM) showing the center portion of the foamable modified polystyrene particle obtained in Example 1 of the present invention.

Though the foamable modified polystyrene resin particles of the present invention contain the rubber particles in dispersed state, they do not exhibit impact strength as seen in high impact polystyrene resins and the modified polystyrene resin disclosed in JP-A-6-49263. Nevertheless, the foamed article obtained by expansion-molding the foamable modified polystyrene resin particles of the present invention, particularly foamed article obtained by in-mold molding exhibits break resistance (impact strength in the falling weight method) equal to that of foamed articles obtained from the high impact polystyrene resin.

Such properties are surprising properties which cannot be seen in conventional foamable polystyrene resin particles.

As the polystyrene resin (A) which is a raw material in the present invention, there may be used usual polystyrene resin, for instance, styrene homopolymer and a copolymer of styrene with other monomer. Examples of the other monomer are α-methylstyrene, an unsaturated fatty acid ester such as methyl methacrylate or butyl acrylate, an unsaturated fatty acid such as acrylic acid, methacrylic acid or maleic anhydride, and acrylonitrile. Unlike the high impact polystyrene resins, a weight average molecular weight can be adjusted optionally in a range of about 150,000 to about 600,000. The weight average molecular weight is not less than about 250,000, preferably not less than 350,000 from the viewpoint of giving good break resistance to a foamed article, and is not more than about 500,000, preferably not more than about 400,000 from a point that an expansion rate is within a proper range. A weight average molecular weight of polystyrene resins in the high impact polystyrene resins is usually up to 250,000 at most.

As particles of the polystyrene resin (A), since those prepared through conventional suspension polymerization method can be used as they are, no specific pelletizing step is required. It is a matter of course that those obtained by bulk polymerization, emulsion polymerization, solution polymerization or the like, and pulverized if necessary can be used. It is preferable that the average particle size is from about 0.1 to about 3 mm, usually from 0.5 to 1.5 mm. Impact resistance of unmodified polystyrene resin (A) having a weight average molecular weight of 250,000 (Izod impact strength by using a test piece with notch) is 1.5 kg·cm/cm. The impact resistance is determined with Izod impact strength obtained at 23° C. by using a ¼ inch bar and a test piece with notch according to JIS K 7110.

To the raw polystyrene resin may be added usual additives such as a nucleating agent, filler, plasticizer, flame retarder, lubricant, coloring agent, ultraviolet ray absorber and antioxidant in an amount not impairing effects of the present invention.

In case where 0.001 to 1.0% of the nucleating agent is incorporated in the polystyrene resin particle which is a raw material by making, as mentioned above, the concentration distribution of the nucleating agent in the surface neighborhood of particle lower than that in the inside portion of particle, there can be obtained well-balanced properties among mechanical strength, surface smoothness and surface hardness just after molding of the foamed article.

With respect to the concentration distribution of the nucleating agent, the "surface neighborhood of particle" and the "inside portion of particle" are defined as mentioned hereinafter. It should be noted that those definitions differ from definitions of "surface layer portion" and "center portion" with respect to dispersibility of the conjugated diene polymer rubber particles (B) in the polystyrene resin (A). The "surface layer portion" and "center portion" are also defined hereinafter.

The nucleating agent-containing polystyrene resin particles can be obtained by a process (also called a "seed polymerization process") for preparing polystyrene resin particles, wherein the polystyrene resin particles are prepared by suspending polystyrene resin seed particles in an aqueous dispersing medium, adding a styrene monomer in the aqueous dispersing medium continuously or intermittently and polymerizing with impregnating the seed particles with the styrene monomer, characterized in that the whole or a part of 0.001 to 1 part of the nucleating agent to be contained in 100 parts of the finally obtained polystyrene resin particles is present at a stage prior to addition of the styrene monomer.

The polystyrene resin of the polystyrene resin seed particles of the present invention is the same as the above-mentioned polystyrene resin (A).

It is preferable that an amount of the seed particles is from 1 to 80%, particularly from 5 to 50% of a total resin amount after the polymerization. When the amount is less than 1%, it is not preferable because there increases a possibility of the added monomer becoming a homopolymer in the form of powder without being impregnated in the particles. When the amount is too much, a particle size ratio of a growth particle to the seed particle becomes smaller, which is economically disadvantageous.

As the styrene monomer used in the seed polymerization, there are styrene, and other monomer, for example, α-methylstyrene, an unsaturated fatty acid ester such as methyl methacrylate or butyl acrylate, an unsaturated fatty acid such as acrylic acid, methacrylic acid or maleic anhydride, and acrylonitrile. These monomers can be used alone or in a mixture of two or more, and may be used in combination with a bifunctional monomer such as divinylbenzene or alkylene glycol dimethacrylate.

As a polymerization initiator for the styrene monomer in the seed polymerization, there can be used a radical initiator which is generally used for preparation of a thermoplastic polymer. Typical examples of the radical initiator are, for instance, organic peroxides such as benzoyl peroxide, lauroyl peroxide, t-butyl perbenzoate, t-butyl perpivalate, t-butylperoxy isopropylcarbonate, t-butyl peroxyacetate, 2,2-di-t-butyl peroxybutane, t-butylperoxy-3,3,5-trimethylcyclohexanoate, di-t-butyl peroxyhexahydroterephthalate and 1,1-di-t-butylperoxy-3,3,5-trimethylcyclohexane; and azo compounds such as azobisisobutyronitrile and azobisdimethylvaleronitrile. Those polymerization initiators can be used alone or in a mixture of two or more.

As the aqueous dispersing medium, there are, for example, water and the like. Examples of the dispersing agent are, for instance, an organic dispersing agent such as partly saponified polyvinyl alcohol, polyacrylate, polyvinyl pyrrolidone, carboxymethyl cellulose or methyl cellulose; an inorganic dispersing agent such as calcium pyrophosphate, calcium phosphate, calcium carbonate, magnesium pyrophosphate, magnesium phosphate, magnesium carbonate or magnesium oxide, and the like. In case where the inorganic dispersing agent is used, a combination use of a surfactant is desirable.

As the nucleating agent, there are used nucleating agents which are capable of finely dispersing in the polystyrene resin matrix. Examples of the nucleating agent are one or a mixture of two or more selected from, for instance, polymers of methacrylate such as polymethacrylate, copolymer of methacrylate-acrylate and copolymer of methyl methacrylate-butadiene-styrene; styrene copolymers such as styrene-butadiene copolymer, high impact polystyrene, styrene-butadiene-styrene block copolymer, hydrogenated styrene-butadiene-styrene block copolymer and acrylonitrile-styrene copolymer; olefin waxes such as polyethylene wax and ethylene-vinyl acetate copolymer wax; fatty acid esters such as glycerin monostearate, glycerin monobehenate, glycerin mono-12-hydroxy stearate, glycerin monolaurate, glycerin tri-12-hydroxy stearate, glycerin tristearate, glycerin tripalmitate, glycerin trilaurate, glycerin tribehenate and pentaerythritol tetrastearate; hardened vegetable oils such as hardened castor oil, hardened soyabean oil and hardened rape seed oil; amides such as fatty acid amide, aliphatic dicarboxylic acid diamide, aromatic bisamide and aromatic dicarboxylic acid diamide; higher fatty acids such as stearic acid, behenic acid, oleic acid, linoleic acid, linolenic acid and lactic acid; metal salts of a fatty acid such as zinc stearate and calcium stearate; and surfactants such as polyethylene glycol monostearate, polyoxyethylene stearyl ether and polyoxyethylene lauryl ether.

Those nucleating agents are incorporated in an amount of 0.001 to 1.0% in the polystyrene resin. When the content is less than 0.001%, there is a case where cells obtained by expanding becomes nonuniform and bulky, and as a result, a surface hardness of a foamed article just after the molding is lowered. When more than 1.0%, cells obtained by expanding becomes too fine, which not only causes, in some cases, impairing of smoothness of the surface of the foamed article but also is economically disadvantageous.

When the nucleating agent is used, it is important that the concentration of the nucleating agent in the surface neighborhood of particle is lower than that in the inside portion of particle, preferably the concentration of the nucleating agent in the surface neighborhood of particle is not more than 90% of that in the inside portion of particle, more preferably not more than 80%, or the nucleating agent may not be present in the surface neighborhood of particle. The above-mentioned "surface neighborhood of particle" means a portion from the surface of the particle upto a depth of 10% of a particle radius. The remaining portion means the "inside portion of particle". When the concentration of the nucleating agent in the surface neighborhood of particle is the same as or higher than that in the inside portion of particle, mechanical strength and surface smoothness of a foamed article are lowered.

Also kind of the nucleating agent used in the surface neighborhood of particle may be different from that in the inside portion of particle.

The concentration of the nucleating agent is measured in the manner mentioned below. Two plates of about 5 mm thick on which a sand paper of No. 300 to 600 is pasted are prepared. One of them is placed on a table with the surface of the sand paper upward, and thereon is put about 1 g of resin particles, of which particle radius=$\mu$m and concentration A (% by weight) of the nucleating agent are known. Another plate is placed on the resin particles with the pasted sand paper facing downward, and is moved in such a manner as drawing a circle with slightly applying a load on the plate by hand. Thus particles are worn from the surface. When about 10% of the particle radius is worn, the resin particles are taken out and the concentration of the nucleating agent in the particles is measured, thus giving a concentration B (% by weight) of the nucleating agent in the inside portion of particle. The concentration C (% by weight) of the nucleating agent in the surface neighborhood of particle can be calculated by the following equation. The concentration of the nucleating agent in the polymer is, for example, in case where the polymer of methacrylate is used, obtained by measuring an absorbance of C=O band (1750 to 1735 cm$^{-1}$) of an ester with an infrared spectrophotometer.

$$C = \frac{A - B(0.9)^3}{1 - (0.9)^3}$$

The whole or a part of the nucleating agent, preferably not less than 50% thereof, more preferably substantially the whole amount thereof is incorporated in the polystyrene resin seed particles. Examples of the incorporating method are (1) a method wherein the whole or a part of the nucleating agent is previously dissolved or dispersed in a monomer used when preparing seed particles and (2) a method wherein seed particles containing or not containing the nucleating agent are dispersed in an aqueous dispersing medium, and prior to addition of the styrene monomer, the nucleating agent is added alone or in the manner of being dissolved or dispersed in a small amount of solvent or in the styrene monomer to the aqueous dispersing medium, and then the seed particles are impregnated with the agent. A residue of the nucleating agent may be used being dissolved or dispersed in the styrene monomer to be added.

In the present invention, in the first place, the particles of the polystyrene resin (A) are impregnated and polymerized with a conjugated diene monomer or a monomer mixture of the conjugated diene monomer and other monomer (hereinafter the both may be called "conjugated diene monomer system"). This polymerization is called "first impregnation polymerization".

Examples of the conjugated diene monomer are one or more of butadiene, isoprene, chloroprene, 1,4-pentadiene, 1,5-hexadiene and the like. Butadiene is particularly preferable. An impregnating amount is from 5 to 20%, preferably from 5 to 15%, particularly preferably from 7 to 15% on the basis of the polystyrene resin (A) particle. When the amount is less than 5%, break resistance of the obtained foamed article is insufficient. When more than 20%, the obtained foamed article tends to become too soft.

Examples of the other monomer which may be used as optional components in addition to the diene monomer are, for instance, a styrene monomer such as styrene, α-methylstyrene or divinylbenzene; an unsaturated fatty acid ester such as methyl acrylate or butyl acrylate; an unsaturated fatty acid such as acrylic acid, methacrylic acid or maleic anhydride; acrylonitrile and the like. Among them, styrene is particularly preferable. An impregnating amount of the other monomer varies depending on kind thereof. It is preferable that the amount is not more than 20%, usually from 3 to 10% on the basis of the polystyrene resin (A) particle.

The polymerization of the conjugated diene monomer is carried out by using a polymerization initiator. The polymerization may be carried out by impregnating the resin particle with the monomer to which the initiator is previously added. It is preferable, in order to obtain the polymer rubber particles in more uniform dispersion state, that the polymerization is carried out after impregnating the resin particle with the monomer uniformly and then with the initiator uniformly. Examples of the polymerization initiator are, for instance, benzoyl peroxide, lauroyl peroxide, t-butyl peroxybenzoate, 1,1-di-t-butylperoxy-2,4-di-t-butylcyclohexane and the like. The amount of the polymerization initiator is from 0.05 to 5%, preferably from 0.1 to 2% on the basis of the conjugated diene monomer.

That impregnation polymerization can be carried out in the system where the polystyrene resin particles are dispersed and suspended in water by impregnating with the conjugated diene monomer system and polymerization initiator uniformly at a polymerization temperature (usually 50° to 100° C.) or a temperature lower than that and then holding at the polymerization temperature for 1 to 20 hours.

The resin particles obtained by the first impregnation polymerization do not have, in themselves, such an impact resistance as recognized in the high impact polystyrene resins. As mentioned later, a foamed article produced through in-mold molding by using foamable resin particles prepared by impregnating the obtained resin particles with a blowing agent is inferior in fusion rate between the particles.

One of the most significant features of the present invention lies in a point that the resin particles obtained by the first impregnation polymerization are further impregnated and polymerized with a styrene monomer (this is called "second impregnation polymerization").

Example of the styrene monomer used in the second impregnation polymerization is the styrene monomer exemplified as the optional component in the first impregnation polymerization. The styrene monomer used may be the same as or different from that of the first impregnation polymerization The amount of the styrene monomer used in the second impregnation polymerization is from 3 to 50%, preferably from 5 to 30% on the basis of the polystyrene resin (A) particles. When more than 50%, it is necessary to increase relatively the amount of the conjugated diene monomer to be used in the first impregnation polymerization and dispersion stability tends to be lowered. When less than 3%, improvement in fusion of the particles tends to be lowered.

The amount of the polymerization initiator is usually from 0.05 to 5%, preferably from 0.5 to 2% on the basis of the styrene monomer, but may be decreased when there remains the polymerization initiator which was not consumed in the first impregnation polymerization.

The particles of the modified polystyrene resin (C) obtained through the second impregnation polymerization do not yet have such impact strength as recognized in the high impact polystyrene resins and the resin disclosed in JP-A-6-49263. This is also a feature of the present invention. The impact resistance of the modified polystyrene resin (C) is from 1 to 5 kg·cm/cm (Izod impact strength by using a test piece with notch). An impact resistance of resins called high impact polystyrene is generally not less than 6 kg·cm/cm. The impact strength of the modified polystyrene resin (C) is measured according to the above-mentioned JIS K 7110. In case where a blowing agent is contained in a test piece, the blowing agent is removed by reprecipitation method before the measurement.

The particle of the modified polystyrene resin (C) contains the conjugated diene polymer rubber particles (B) which have substantially spherical form and are dispersed uniformly throughout the resin particle. Unlike the so-called high impact polystyrene resins which contain rubber particles having a large particle size, most of the conjugated diene polymer rubber particles have a particle size of not more than about 0.2 $\mu$m, usually not more than 0.1 $\mu$m . It is presumed that the conjugated diene polymer rubber particles have complicated chemical and physical relation with the polystyrene resin which is a matrix resin. It seems that such a state prevents impact resistance from being exhibited in the non-expanded resin and after expanding, high break resistance is given to the foamed article.

The rubber particles, as mentioned hereinafter in detail, have a feature that they maintain the spherical form without being deformed substantially in the cell membrane even after the expanding. When the high impact polystyrene resin is used, the rubber particles are in a flat form (JP-A-7-11043). Considering a point that the rubber portion having the flat form contributes to exhibition of break resistance, the exhibition of break resistance of the foamed article of the present invention is unexpected surprising fact.

In the present invention, the state of the conjugated diene polymer rubber particles (B) which are "uniformly dispersed throughout" the polystyrene resin particle (A) means that the distributing state of the rubber particles (B) does not differ between the surface layer portion and the center portion of the polystyrene resin particle (A) or is slightly sparser in the surface layer portion.

In the present invention, the "surface layer portion" means a portion defined between the depth of 2 μm to 6 μm from the surface of the modified polystyrene resin particle toward the center thereof. The "center portion" means a sphere portion having a radius of 50 μm, the center of said sphere portion being the center of the modified polystyrene resin particle, provided that the particle is a sphere.

Figure 2:
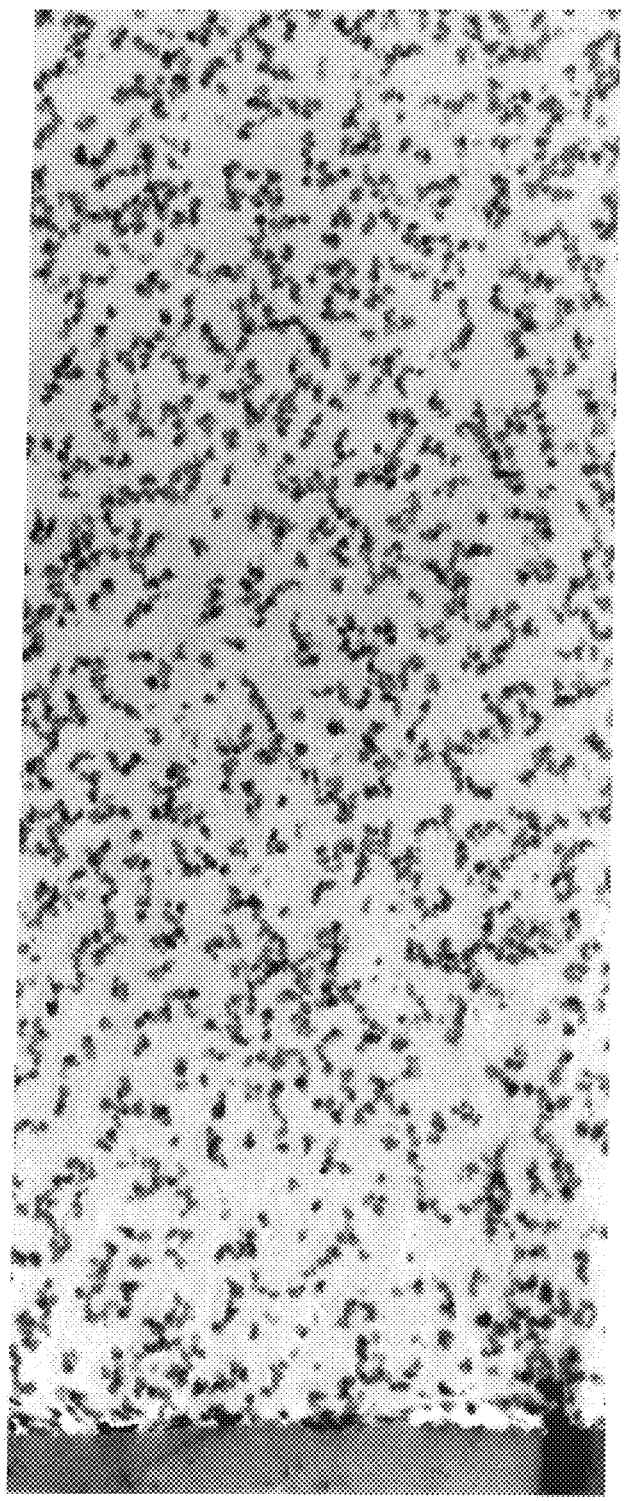
FIG. 2 is a photograph of TEM showing the surface portion of the foamable modified polystyrene particle obtained in Example 1 of the present invention.
Figure 3:
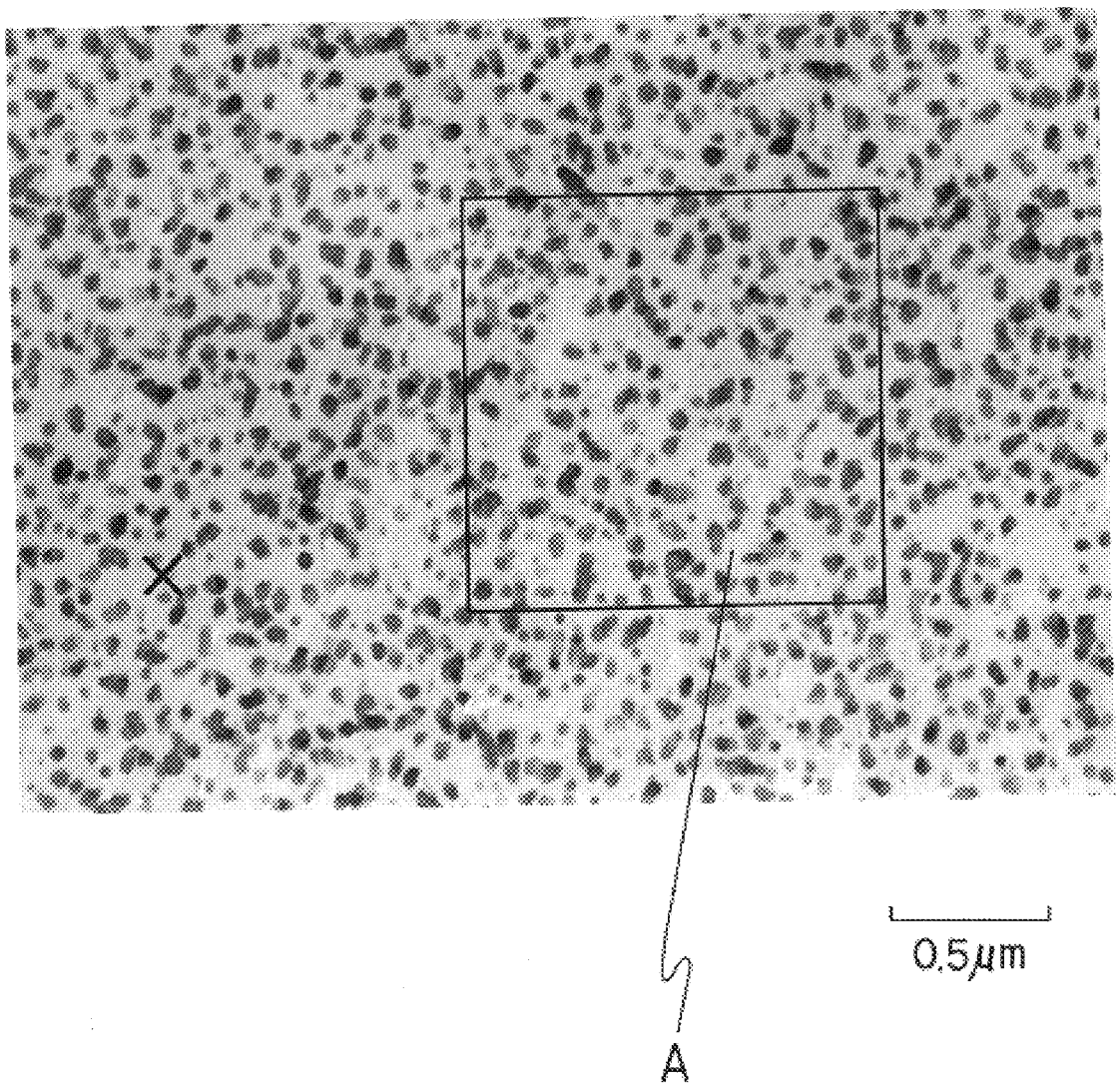
FIG. 3 is a photocopy of FIG. 1 for measuring an area percentage of rubber particles and an area ratio of rubber particles.

The concrete measuring method is explained below by using photographs of the modified polystyrene resin particle prepared in Example 1 mentioned hereinafter, which were taken with a transmission electron microscope (TEM). FIG. 1 is a TEM photograph (×40000) of the "center portion", and FIG. 2 is a TEM photograph (×40000) of the "surface layer portion". FIGS. 3 (In FIG. 3, X mark represents the center of the particle) and 4 are photocopies of FIGS. 1 and 2, respectively for measuring an area percentage (%) of the rubber particles.

The area percentage (%) of the rubber particles is measured and calculated as follows.

Figure 4:
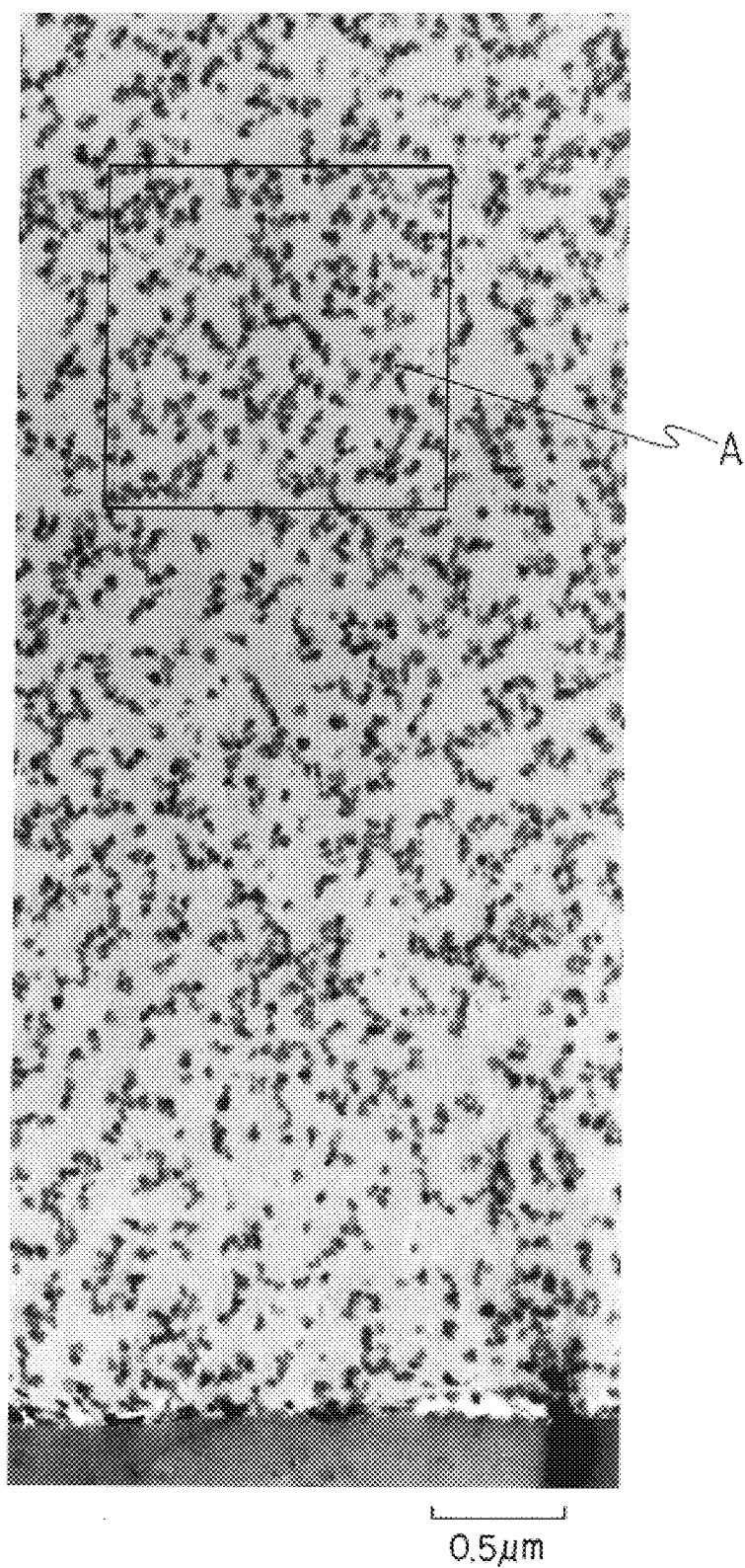
FIG. 4 is a photocopy of FIG. 2 for measuring an area percentage of rubber particles and an area ratio of rubber particles.

First an area A (1.25 μm×1.25 μm) surrounded by a full line in FIGS. 3 and 4 is enlarged by four times with a copying machine, respectively, and a weight thereof is measured. Black region (rubber particles dyed with osmium oxide) are cut off, and a weight of the cut portions B (or remaining portions after cutting off) is measured. The area percentage (%) of the rubber particles is represented by (cut portions B/total area A)×100. In FIG. 1 (FIG. 3) and FIG. 2 (FIG. 4), the area percentage is 30% and 26%, respectively.

Then the "area ratio of rubber particles" of the "surface layer portion" to the "center portion" is calculated.

$$\text{Area ratio of rubber particles} = \frac{\text{Area percentage (\%) of rubber particles of surface layer portion}}{\text{Area percentage (\%) of rubber particles of center portion}}$$

In the present invention, the state of "being uniformly dispersed throughout" is as mentioned above. From an aspect of "an area ratio of the rubber particles", the area ratio is preferably from 0.85 to 1.15, particularly preferably from 0.85 to 1.10.

When the area ratio of rubber particles exceeds 1.15, there is tendency that fusion at the time of molding is inferior.

The foamable modified polystyrene resin particles of the present invention are those in which the blowing agent is contained in the modified polystyrene resin particles. The blowing agent may be introduced into the resin particles together with the conjugated diene monomer system during the first impregnation polymerization, may be introduced together with the styrene monomer during the second impregnation polymerization, or may be impregnated after the second impregnation polymerization. From the viewpoints of a pressure inside a reactor and dispersion stability, it is preferable that the blowing agent is introduced after the second impregnation polymerization.

As the blowing agent, a volatile blowing agent is preferable. Examples of the blowing agent are, for instance, one or more of butane, pentane and the like. Among them, use of butane or pentane alone or a mixture thereof is preferable. A small amount of cyclohexane, cyclopentane or hexane may be used in combination therewith. Particularly pentane (including n-pentane or iso-pentane alone or a mixture thereof) is preferable.

The amount of the blowing agent may be the same as that for un-modified polystyrene resin particles, and may be selected within the range of 3 to 15 parts, usually 5 to 10 parts on the basis of 100 parts of the resin particles in consideration of the desired expansion ratio.

Further in order to improve the expansion rate, a solvent may be used. As the solvent, suitable are, for example, cyclohexane, and aromatic hydrocarbons such as toluene, xylene and ethylbenzene.

In case of impregnation suspension polymerization, in order to enhance dispersibility of the resin particles, there can be used a dispersing agent, for example, an organic dispersing agent such as partly saponified polyvinyl alcohol, polyacrylate, polyvinyl pyrrolidone, carboxymethyl cellulose or methyl cellulose; an inorganic dispersing agent such as calcium pyrophosphate, calcium phosphate, calcium carbonate, magnesium pyrophosphate, magnesium phosphate, magnesium carbonate or magnesium oxide, and the like. In case where the inorganic dispersing agent is used, a combination use of a surfactant is desirable.

The present invention further relates to a process for preparing a foamed article by expansion-molding the foamable modified polystyrene resin particles and relates to the foamed article. The foamed article of the present invention includes, as mentioned above, pre-expanded particles obtained by expanding the foamable modified polystyrene resin particles and a foamed article obtained by in-mold molding of the pre-expanded particles.

First, the pre-expanded particles are explained below. The pre-expanded particles are obtained by impregnating the pellets of the modified or unmodified polystyrene resin particles with the blowing agent and then heating, for example, with steam or the like for the expansion. The pre-expansion method is a well known technique and can be used for the present invention as it is.

In the cell membrane of the pre-expanded particles, the rubber particles are maintained in the substantially spherical form without being deformed.

Those pre-expanded particles have break resistance and can be used as they are for a loose fill type cushioning material. They are particularly useful as a material for a foamed article obtained by in-mold molding which is explained next.

The in-mold molding is a well known method for producing a foamed article by putting the pre-expanded particles in the mold and heating for fusion between the pre-expanded particles. In the present invention, usual pre-expanding conditions may be properly selected.

The thus produced foamed article have sufficient fusion between the pre-expanded particles, and high break resistance is exhibited.

The foamed article of the present invention has a feature of having a cell membrane of the modified polystyrene resin in which the conjugated diene polymer rubber particles are dispersed and maintain substantially spherical form in the cell membrane.

Also the foamed article of the present invention has a feature of having a fusion rate between the pre-expanded particles of not less than 50%, preferably not less than 70% and an impact strength ratio according to the falling weight method of 1.35 to 1.84 which is an index of the break resistance.

The "impact strength ratio according to the falling weight method" of the present invention means a value obtained as follows.

According to JIS K 7211, a 321 g steel ball is dropped on a 200 mm×20 mm×40 mm test piece of a foamed article and a 50% failure height which causes rupture of 50% of the number of test pieces of the foamed article is calculated by the following equation:

$$H_{50} = H_i + d\left[\frac{\sum(i \cdot n_i)}{N} \pm 0.5\right]$$

where
- $H_{50}$: A 50% failure height (cm) which causes rupture of 50% of the number of test pieces of the foamed article
- $H_i$: Test height (cm) when the height level (i) is zero, representing the height anticipated to cause the rupture of the test piece
- d: Height interval (cm) for increasing or decreasing the test height
- i: Height level which increases or decreases by one, taking the value of zero when the test height is $H_1$ (i= - - - -3, -2, -1, 0, 1, 2, 3, - - - )
- ni: Number of test pieces which break (or do not break) at each height level
- N: Total number of test pieces which break (or do not break) (N=$\Sigma n_i$)
   Whichever is the larger of the number of broken or unbroken test pieces shall be used. In case where the numbers are the same, either one may be used.
- ±0.5: This value shall be negative when using the data when broken and be positive when using the data when unbroken.

When a 50% failure height which causes rupture of 50% of the number of test pieces of a foamed article obtained by in-mold molding of unmodified polystyrene resin particles under the expansion-molding conditions mentioned later is assumed to be 1, an "impact strength ratio according to the falling weight method" means a ratio of a 50% failure height which causes rupture of 50% of the number of test pieces of a foamed article obtained under the same expansion-molding conditions to the 50% failure height in case of the unmodified polystyrene resin particles. It is shown that the more the ratio is, the higher the break resistance is.

The "fusion rate" in the present invention is obtained by:
breaking, by hand, the foamed article produced under the same expansion-molding conditions as the foamed article for measuring the impact strength ratio;
with respect to the pre-expanded particles on the surface (area: 30 cm$^2$) of the broken portion, counting the number (X) of particles broken at interfaces between the particles and the number (Y) of particles broken inside thereof; and
calculating a fusion rate (%) by the equation of [(Y)/(X)+(Y)]×100.

It is shown that the particles broken inside thereof have been fused sufficiently.

The expanding and molding conditions of the foamed article used for measuring the impact strength ratio and fusion rate are mentioned below. Those conditions are also employed in Examples and Comparative Examples which are mentioned hereinafter.

(Pre-Expansion Conditions)
Foamable Resin Particles
   Average particle size: 1 μm
   Blowing agent: Pentane (normal/iso=40/60)
A normal pressure pre-expanding equipment which was pre-heated is charged with 1 to 2 kg of foamable resin particles, followed by passing steam at about 0.6 kg/cm$^2$ and introducing air properly with stirring. Thus the particles are expanded up to a given expansion ratio in about 1 to about 3 minutes.

(In-Mold Molding Conditions)
After molding under the following conditions, a foamed article is allowed to stand for vacuum cooling.
   Molding machine: TH90VMII available from Toyo Kikai Kinzoku Kabushiki Kaisha
   Expansion ratio: 40 times
   Molding conditions:
      Pre-steaming: 3 seconds
      One-way steaming: 4 seconds
      Opposite steaming: 1 second
      Autoclave steaming: 12 seconds
      Additional steaming: 3 seconds
      Retaining: 3 seconds
      Water cooling: 20 seconds
Set steam pressure at the heating from both sides:
   Cavity/core=0.65/0.85 (kg/cm$^2$)

Then differences between the foamed article of the present invention and the foamed article of conventional polystyrene resin are explained below.

The foamed article of a high impact polystyrene resin is excellent in a fusion rate which is not less than 50% and in an impact strength ratio by the falling weight method which is from 0.6 to 2. 0. However such a restriction in a preparation process that the resin particles are prepared by polymerizing styrene in the presence of rubber particles makes it difficult to increase a molecular weight of the polystyrene portion. Also in the high impact polystyrene resin since the rubber particles become flat (L/D =10 to 70), the above-mentioned high break resistance is obtained. Therefore in both viewpoints of the raw material and foamed article, the present invention is fundamentally different from the high impact polystyrene resin.

The preparation process disclosed in JP-A-6-49263 is analogous to the process of the first impregnation polymerization of the present invention, but is a process wherein a concentration of rubber particles increases around the surface portion of the polystyrene resin particle by using a monomer mixture of a conjugated diene monomer and a styrene monomer and polymerizing the conjugated diene monomer mainly around the surface portion of the polystyrene resin particle. However the above patent publication does not teach the second impregnation polymerization step of the present invention in which only a styrene monomer is used, because the aim of the patent publication is to provide a technique for obtaining a high expansion ratio by increasing the concentration of the rubber particles around the surface portion of the resin particle. Thus there is such a difference that while in the present invention the rubber particles are dispersed uniformly in the modified polystyrene resin particle before expanding, in JP-A-6-49263 the rubber particles are present locally around the surface portion of the resin particle before expanding. As a result, the foamed article obtained from the resin particles disclosed in the above-mentioned patent publication has a fusion rate up to 40% at most and a less improved impact strength ratio up to about 1.3.

As mentioned above, from the viewpoint of physical properties, the foamable modified polystyrene resin particles and foamed article of the present invention lie between the high impact polystyrene resins and the resin particles and foamed article disclosed in JP-A-6-49263.

From the viewpoint of production cost, however, the present invention is more excellent than the high impact polystyrene resins.

The present invention is then explained based on Examples, and is not limited thereto.

Physical properties in Examples and Comparative Examples are determined according to the methods mentioned below.

(1) Foamable Modified Polystyrene Resin Particles
(Weight Average Molecular Weight)

Raw polystyrene resin particles before modified are dissolved in tetrahydrofuran, followed by measuring with GPC (HLC-8020 available from Toso Kabushiki Kaisha, column: TSK gel GMHXL 30 cm×2).

Modified polystyrene resin or high impact polystyrene resin is dissolved in tetrahydrofuran and an insoluble portion is subjected to centrifuging, followed by measuring a weight average molecular weight of a soluble portion with the same GPC.

(Impact Resistance)

As mentioned above.

(Size and Distribution of Rubber Particles)

The rubber particles in the resin particle are dyed with osmium oxide, followed by viewing with a transmission electron microscope (TEM) (JEM-1200EX available from Nippon Denshi Kabushiki Kaisha, ×7200 to ×40000). Photographs of the rubber particles in the inside portion and around the surface portion of the resin particle are observed with naked eyes.

(Area Percentage of Rubber Particles in the Surface Layer Portion and in the Center Portion and Area Ratio of Rubber Particles)

As mentioned above.

(Gel Content)

Polystyrene resin particles after modified are dissolved in a mixed solvent of methyl ethyl ketone/methanol, followed by measuring a weight percentage (%) of an insoluble portion.

(2) Foamed Article (Impact Strength According to Falling Weight Method)

As mentioned above.

(Fusion Rate)

As mentioned above.

(Compression Strength)

Compression strength is measured at 25% compression according to JIS A 9511.

REFERENCE EXAMPLE 1

(Preparation of Polystyrene Resin Particles by Seed Polymerization)

A 5-liter reactor equipped with an introducing port at the lower portion thereof and a flat stirring blade was charged with 3000 parts of an aqueous dispersion medium containing 3000 ppm of a fine powder of calcium tertiary phosphate, 50 ppm of polyvinyl alcohol (GOHSENOL PH-20: available from Nippon Gosei Kagaku Kogyo Kabushiki Kaisha) and 50 ppm of sodium dodecylbenzene sulfonate, followed by starting the stirring.

Figure 9:
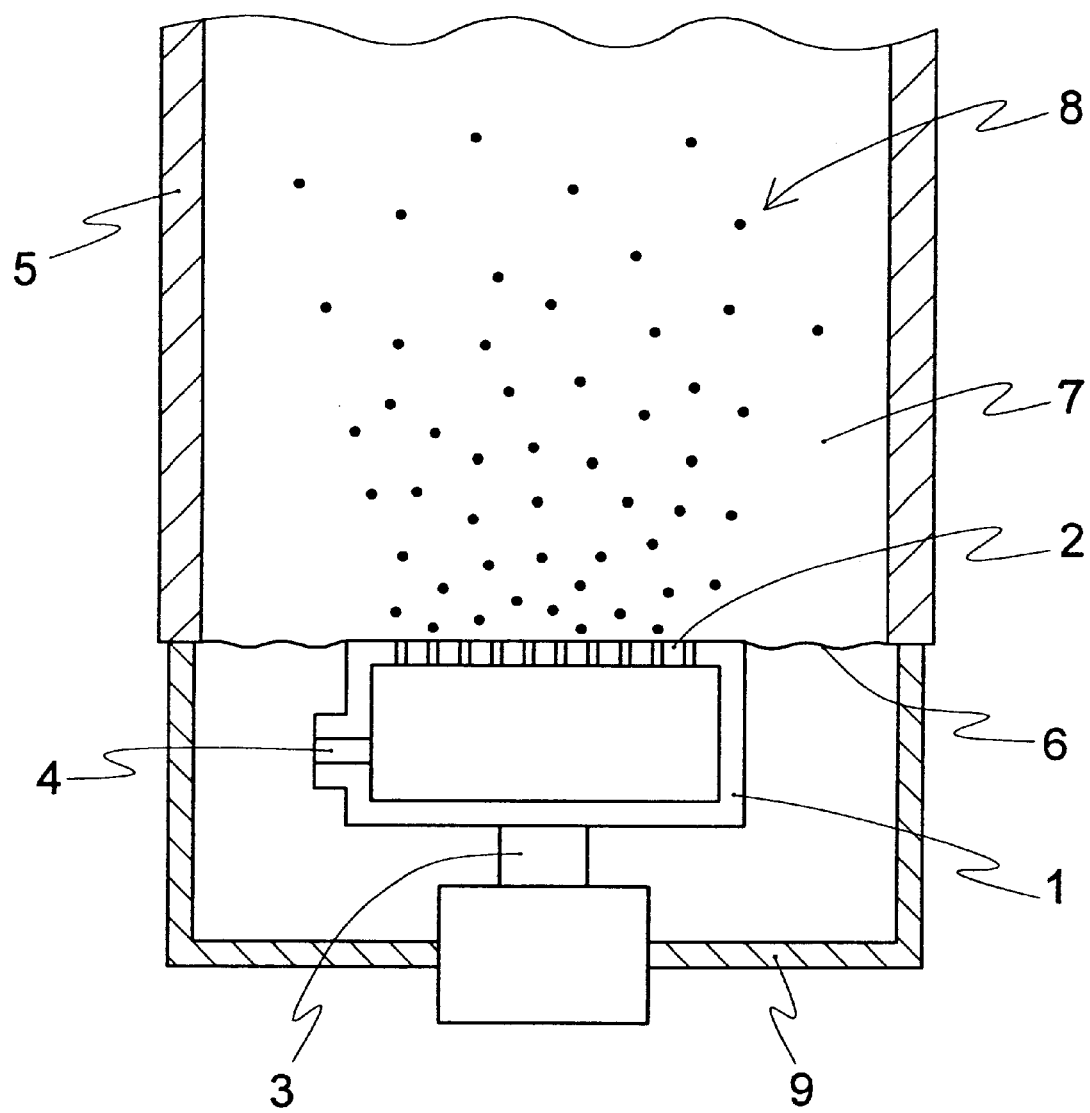
FIG. 9 is a schematic cross sectional view of droplet forming device used in Reference Example of the present invention.

Then in 700 parts of styrene monomer were dissolved 2.1 parts of benzoyl peroxide and 0.35 part of a methyl methacrylate-butyl acrylate copolymer (KANE ACE PA-20 available from Kaneka Corporation) as a nucleating agent. The mixture was fed at a rate of 0.8 liter/hour into a liquid droplet generator equipped with five nozzles having a diameter of 0.2 mm as shown in FIG. 9, and then 500 Hz mechanical vibration was given to the mixture to generate liquid droplets 8 in an aqueous dispersion medium 7, which were then introduced into the above-mentioned 5-liter reactor through a liquid droplet feeding tube 5 by utilizing buoyancy of the liquid droplets. In FIG. 9, numeral 1 represents a nozzle box, numeral 2 represents a nozzle plate, numeral 3 represents a vibrating part of the vibrator, numeral 4 represents a styrene monomer feeding port, numeral 6 represents a diaphragm and numeral 9 represents a support frame of the vibrator. After 500 parts of liquid droplets had been introduced, the generation of the liquid droplets was stopped and the dispersion in the reactor was heated up to 90° C. to polymerize for three hours. Further the dispersion was heated to 110° C. and held for one hour to complete the polymerization. A slurry in the reactor was cooled, dehydrated and dried to give polymer particles. The obtained particles are called "seed particles".

Subsequently a 5-liter reactor equipped with a stirrer was charged with 100 parts of water, 0.4 part of calcium tertiary phosphate, 0.012 part of sodium dodecylbenzene sulfonate and 10 parts of the above seed particles. With stirring, the dispersion in the reactor was heated to 90° C. Then to the dispersion was added dropwise 90 parts of a styrene monomer and 0.22 part of benzoyl peroxide separately at a rate shown in Table 1 over 6.5 hours. Six hours after the start of addition, 0.1 part of 1,1-bis-t-butylperoxy-3,3,5-trimethylcyclohexane was added. The polymerization was carried out for seven hours in total. Then after cooling, the obtained polystyrene resin particles were taken out, dehydrated and dried.

TABLE 1

| Time (hour) | Styrene monomer (part) | Initiator (part) |
| --- | --- | --- |
| 0–2 | 15 | 0.078 |
| 2–4 | 25.4 | 0.068 |
| 4–6.5 | 49.6 | 0.085 |
| Total | 90 | 0.231 |

EXAMPLES 1 to 6

A 5-liter reactor with a stirrer was charged with an aqueous suspension comprising 120 parts of water, 0.012 part of sodium α-olefin sulfonate, 0.4 part of calcium phosphate and 100 parts of polystyrene particles having an average particle size of 1 mm (weight average molecular weight is shown in Table 2), and then was sealed. With stirring, the mixture was heated to 80° C., and impregnated with butadiene or a monomer mixture of butadiene and styrene in an amount shown in Table 2. As the initiator, 0.074 part of lauroyl peroxide was added, followed by the first impregnation polymerization for six hours.

Then the reactor was heated to 90° C. and 10 parts of styrene and 0.14 part of benzoyl peroxide were added additionally over one hour, followed by heating to 115° C. over one hour and conducting the second impregnation polymerization for two hours.

Subsequently 7 parts of pressurized pentane (normal-pentane/iso-pentane=40/60) was introduced and impregnation of pentane was carried out at 115° C. for two hours. The mixture was then cooled to 30° C. and taken out of the reactor, followed by dehydrating and drying to give foamable modified polystyrene particles of the present invention.

The obtained resin particles were pre-expanded by about 40 times under the above-mentioned conditions to give pre-expanded particles. The pre-expanded particles were allowed to stand for 24 hours, followed by in-mold molding under the above-mentioned conditions with the molding machine TH90VMII available from Toyo Kinzoku Kabushiki Kaisha to give a foamed article.

EXAMPLE 7

Foamable polystyrene particles were obtained in the same manner as in Example 1 except that raw polystyrene particles prepared in Reference Example 1 were used. A foamed article was produced by pre-expanding and in-mold molding in the same manner as in Example 1.

COMPARATIVE EXAMPLE 1

Foamable polystyrene particles were obtained in he same manner as in Example 1 except that a blowing agent was impregnated without modifying (impregnation polymerization) raw polystyrene particles. The obtained resin particles were subjected to pre-expanding and in-mold molding in the same manner as in Example 1 to give a foamed article.

COMPARATIVE EXAMPLE 2

Foamable modified polystyrene particles were obtained in the same manner as in Example 5 except that second impregnation polymerization (addition and polymerization of styrene) was not carried out. Then pre-expanded particles were obtained and subjected to in-mold molding in the same manner as in Example 1 to give a foamed article.

COMPARATIVE EXAMPLE 3

A 5-liter reactor with a stirrer was charged with an aqueous suspension comprising 120 parts of water, 0.012 part of sodium α-olefin sulfonate, 0.4 part of calcium phosphate and 100 parts of polystyrene particles having an average particle size of 1 mm, and then was sealed.

Separately 10 parts of a styrene monomer and 15 parts of butadiene were mixed under pressure to give a liquid monomer mixture. To the monomer mixture were added 0.125 part of benzoyl peroxide and 0.0313 part of t-butyl peroxybenzoate as a polymerization initiator to give a mixture.

The obtained mixture was added in the reactor and dispersed together with polystyrene particles in an aqueous medium. The dispersion was stirred at 60° C. for two hours and the mixture was absorbed in the polystyrene particles. The dispersion was then heated to 90° C. and held for four hours and further heated to 125° C. and held for two hours to copolymerize styrene with butadiene. The dispersion was then cooled to 100° C. and thereto was added 12.5 parts of pressurized pentane as a blowing agent, followed by holding for six hours to impregnate the particles with the blowing agent. The dispersion was cooled to 30° C., taken out of the reactor, and then dehydrated and dried to give foamable polystyrene particles.

This Comparative Example 3 corresponds to the invention disclosed in JP-A-6-49263.

COMPARATIVE EXAMPLE 4

A high impact polystyrene resin (rubber content: 8%, molecular weight of a polystyrene portion: 230000) was extruded and cut to give small particles of about 1 mg. Those resin particles were impregnated with a blowing agent in the same manner as in Example 1 to give foamable high impact polystyrene resin particles which were then subjected to pre-expanding and in-mold molding in the same manner as in Example 1 to give a foamed article.

The results of evaluation of the foamable modified polystyrene resins and foamed articles in Examples 1 to 7 and Comparative Examples 1 to 4 are shown in Table 2. In Table 2, Bd and St represent butadiene and styrene, respectively.

TABLE 2

|  | Ex. 1 | Ex. 2 | Ex. 3 | Ex. 4 | Ex. 5 | Ex. 6 | Ex. 7 |
|---|---|---|---|---|---|---|---|
| Conditions for preparation | | | | | | | |
| Weight average molecular weight of raw polystyrene | 35 | 40 | 45 | 35 | 35 | 35 | 35 |
| First-impregnation-polymerized monomer (part) | Bd (10) | Bd (10) | Bd (10) | Bd (6) | Bd (15) | Bd/St (10/5) | Bd (10) |
| Second-impregnation-polymerized monomer (part) | St (10) | St (10) | St (10) | St (10) | St (10) | St (10) | St (10) |
| Foamable modified polystyrene resin particles | | | | | | | |
| Impact resistance (kg · cm/cm) | 1.7 | 1.7 | 1.8 | 1.5 | 1.8 | 1.6 | 1.7 |
| Gel content (% by weight) | 19 | 20 | 20 | 13 | 22 | 18 | 18 |
| Rubber particles distribution | Uniform (FIG. 1, 2) | Uniform | Uniform | Uniform | Uniform | Uniform | Uniform |
| Area percentage of rubber particles (%) | | | | | | | |
| Surface layer portion | 26 | 25 | 26 | 19 | 31 | 28 | 25 |
| Center portion | 30 | 27 | 27 | 20 | 30 | 29 | 27 |
| Area ratio of rubber particles | | | | | | | |
| Surface layer portion/center portion | 0.87 | 0.93 | 0.96 | 0.95 | 1.03 | 0.97 | 0.93 |
| Particle size of rubber particles ($\mu$m) | 0.05 | 0.06 | 0.06 | 0.05 | 0.05 | 0.07 | 0.05 |
| Foamed article | | | | | | | |
| Impact strength by falling weight method (cm) | 19 | 20 | 21 | 17 | 22 | 18 | 19 |

TABLE 2-continued

| | | | | | | | |
|---|---|---|---|---|---|---|---|
| Impact strength ratio | 1.52 | 1.6 | 1.68 | 1.35 | 1.76 | 1.44 | 1.52 |
| Fusion rate (%) | 90 | 90 | 85 | 90 | 85 | 80 | 90 |
| Compression strength (kg/cm$^2$) | 1.85 | 1.85 | 1.85 | 1.9 | 1.6 | 1.85 | 1.85 |

| | Com. Ex. 1 | Com. Ex. 2 | Com. Ex. 3 | Com. Ex. 4 |
|---|---|---|---|---|
| Conditions for preparation | | | | |
| Weight average molecular weight of raw polystyrene | 35 | 35 | 35 | (HIPS) |
| First-impregnation polymerized monomer (part) | — | Bd (15) | Bd/St (15/10) | — |
| Second-impregnation polymerized monomer (part) | — | — | — | — |
| Foamable modified polystyrene resin particles | | | | |
| Impact resistance (kg · cm/cm) | 1.5 | 1.8 | 3.0 | 9 |
| Gel content (% by weight) | — | 15 | 21 | 16 |
| Rubber particles distribution | — | Highly dense in surface layer portion | Highly dense in surface layer portion (FIG. 4) | Uniform (FIG. 6) |
| Area percentage of rubber particles (%) | | | | |
| Surface layer portion | — | 35 | 34 | — |
| Center portion | — | 30 | 29 | — |
| Area ratio of rubber particles | | | | |
| Surface layer portion/center portion | — | 1.17 | 1.17 | — |
| Particle size of rubber particles (μm) | — | 0.05 | 0.07 | 2 |
| Foamed article | | | | |
| Impact strength by falling weight method (cm) | 12.5 | 16 | 16 | 22 |
| Impact strength ratio | 1 | 1.28 | 1.28 | 1.76 |
| Fusion rate (%) | 90 | 30 | 40 | 90 |
| Compression strength (kg/cm$^2$) | 2.5 | 1.5 | 1.6 | 1.9 |

Figure 5:
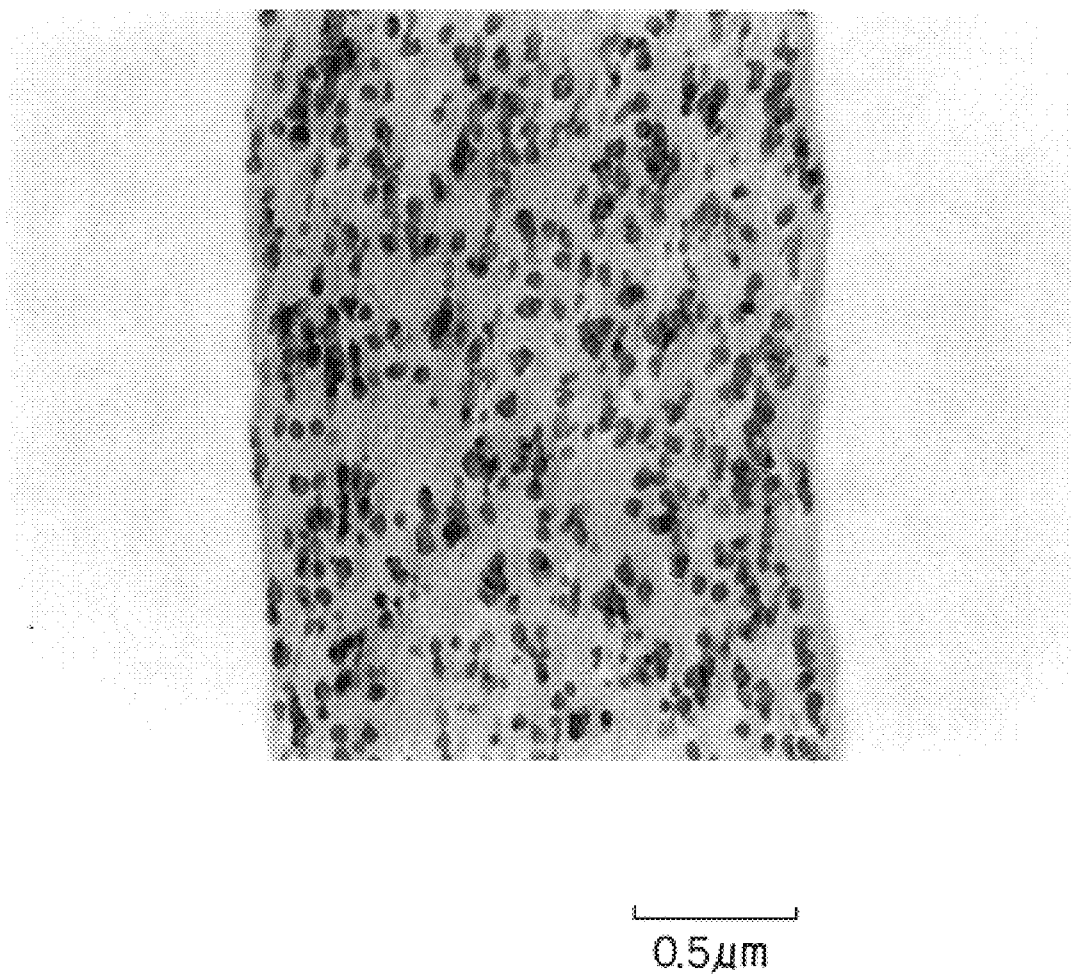
FIG. 5 is a photograph of TEM showing the foamed article obtained in Example 1 of the present invention.
Figure 6:
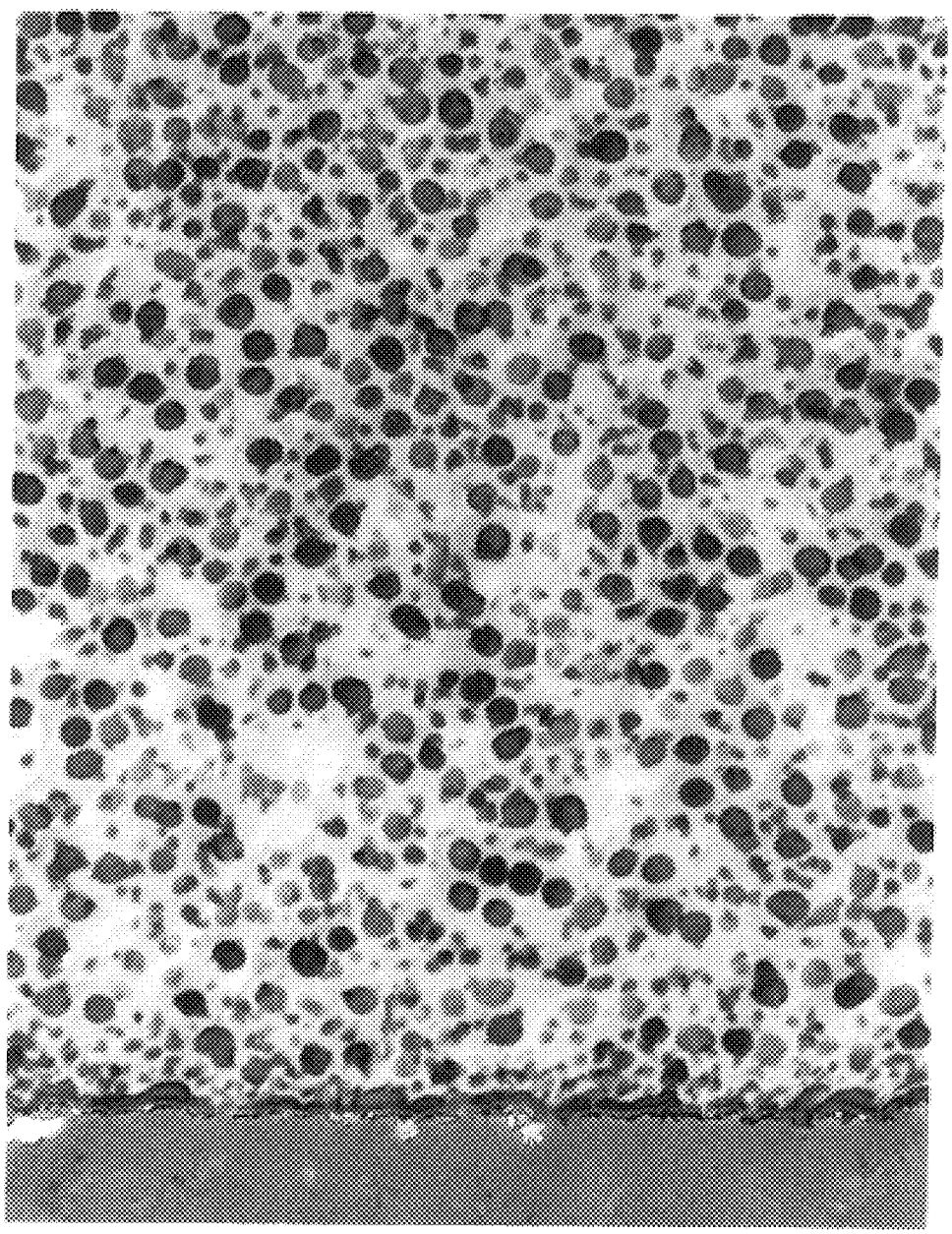
FIG. 6 is a photograph of TEM showing the surface portion of the foamable modified polystyrene particle obtained in Comparative Example 3.
Figure 7:
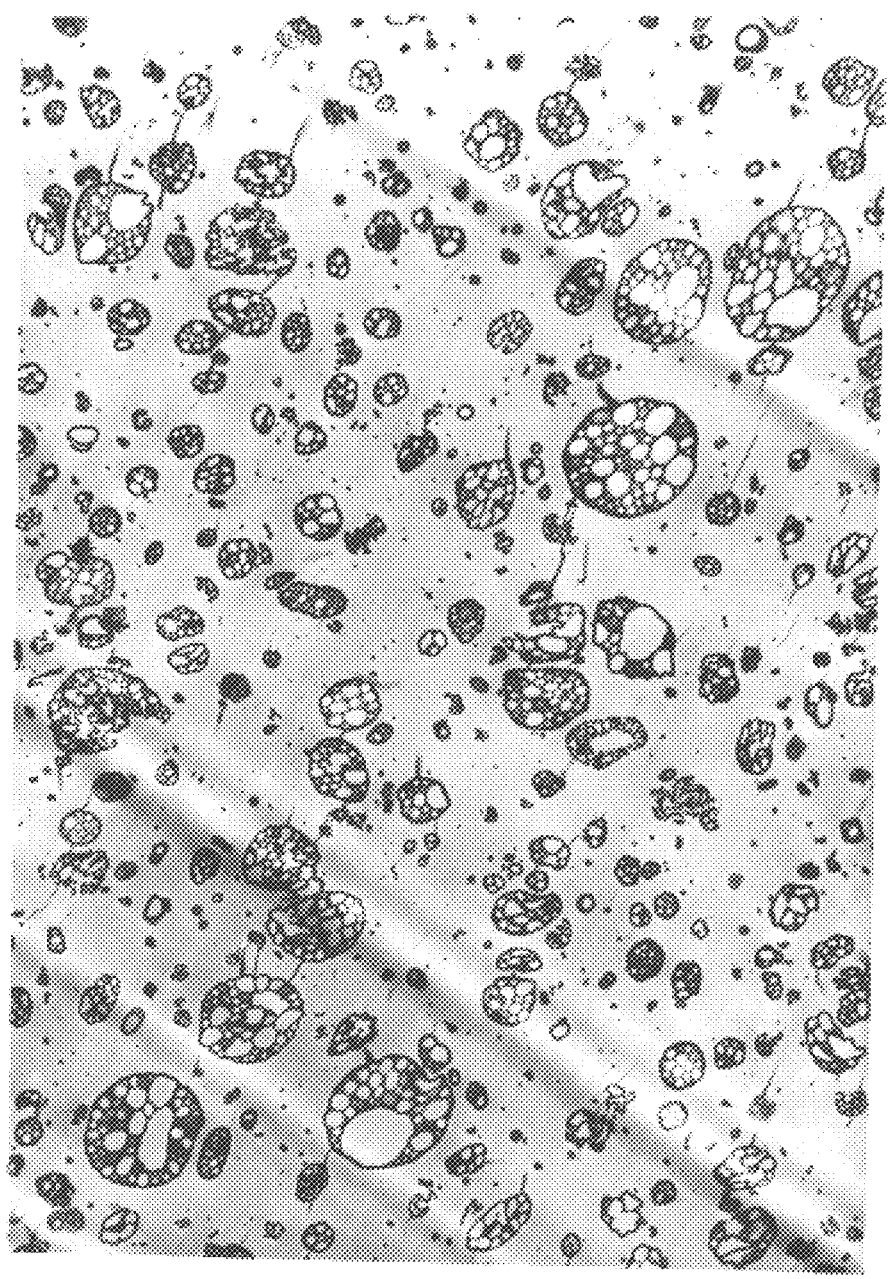
FIG. 7 is a photograph of TEM showing the center portion of the foamable high impact polystyrene resin article obtained in Comparative Example 4.
Figure 8:
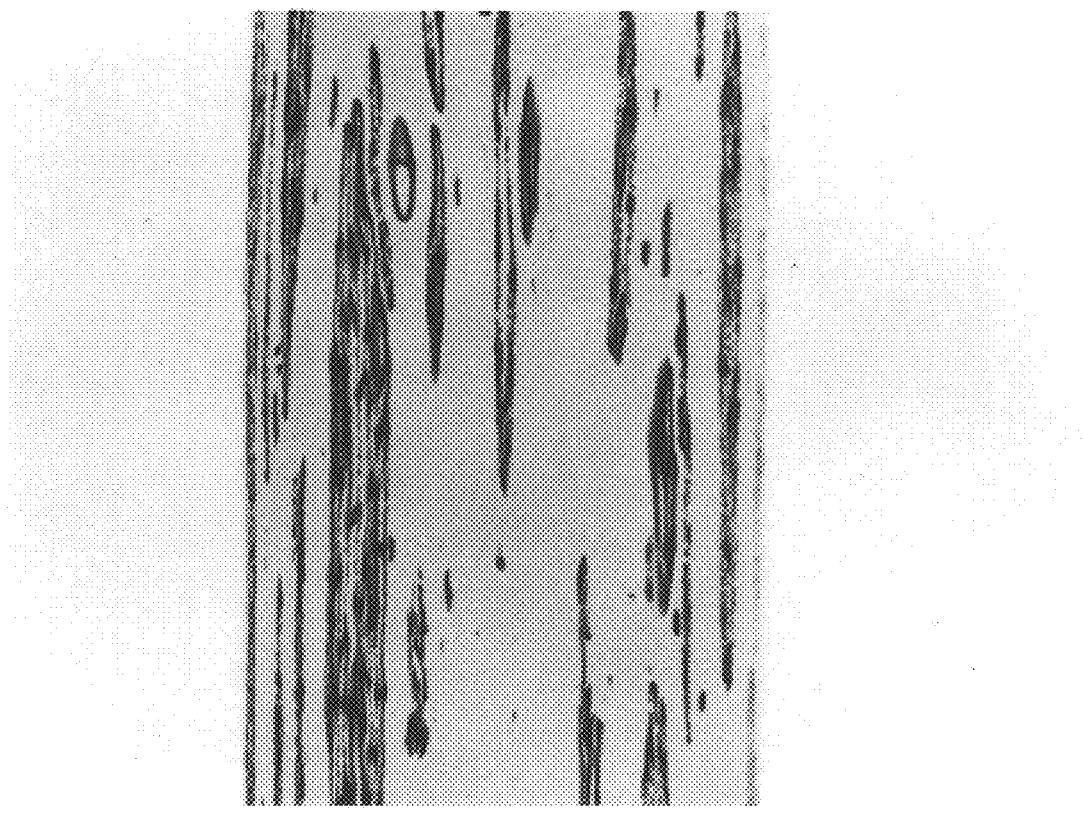
FIG. 8 is a photograph of TEM showing the foamed article obtained in Comparative Example 4.

Photographs (×40000) of transmission electron microscope (TEM) in the center portion and around the surface portion of the foamable modified polystyrene particle which was obtained in Example 1 are shown in FIGS. 1 and 2, respectively. A TEM photograph of the foamed article obtained in Example 1 is shown in FIG. 5 (FIGS. 3 and 4 are photocopies of FIGS. 1 and 2 for measuring the area percentage of rubber particles and the area ratio of rubber particles, respectively). Further a TEM photograph of a surface portion of the foamable modified polystyrene particle which was obtained in Comparative Example 3 (corresponding to the invention of JP-A-6-49263) is shown in FIG. 6. Also TEM photographs of the center portion of the foamable modified polystyrene particle and the foamed article which were obtained in Comparative Example 4 are shown in FIGS. 7 and 8, respectively.

It is seen from FIGS. 1 and 2 that the rubber particles are uniformly dispersed throughout the foamable modified polystyrene particle of the present invention. On the other hand, in Comparative Example 3 (FIG. 6) where the second impregnation polymerization was not carried out, a density of the rubber particles is high around the surface portion of the polystyrene resin particle. In the foamable high impact polystyrene resin particle of Comparative Example 4, as shown in FIG. 7 (×7200), large rubber particles are scattering.

In the foamed article of the present invention (FIG. 5), the rubber particles are dispersed uniformly in the cell membrane in substantially the same spherical form as before expanding (FIGS. 1 and 2). On the contrary, in the foamed article produced by using the high impact polystyrene particles of Comparative Example 4 (FIG. 8, ×20000), the rubber particles are stretched greatly and are flat.

As mentioned above, the foamable modified polystyrene resin particles and foamed article of the present invention differ definitely from conventional similar ones, and as shown in Table 2, the foamed article being excellent in break resistance and high in fusion rate can be provided.

INDUSTRIAL APPLICABILITY

According to the present invention, there can be provided a polystyrene foamed article having excellent break resistance and high fusion rate and, foamable modified polystyrene resin particles which are raw materials for producing the foamed article. Such a foamed article can be produced at relatively low cost as compared with an expensive high impact polystyrene resin foamed article.

The foamed article of the present invention can be used for applications where high impact polystyrene resin foamed articles have been used, and is useful as a shock absorbing material particularly for precise electric appliances, for example, OA apparatuses such as CRT and printer and AV apparatuses such as audio system and video tape recorder.

What is claimed is:

1. Foamable modified polystyrene resin particles, wherein the foamable modified polystyrene resin particle (E) comprises a particle of a modified polystyrene resin (C) containing a blowing agent (D); said resin (C) comprises conjugated diene polymer rubber particles (B) having a particle size of not more than 0.2 μm which are dispersed uniformly throughout a polystyrene resin (A), when said foamable modified polystyrene resin particle (E) is expanded, there is substantially no deformation of the rubber particles (B) before and after the expansion, and said conjugated diene polymer rubber is prepared by radically polymerizing a conjugated diene monomer and other monomer in the presence of a radical initiator.

2. Foamable modified polystyrene resin particles, wherein the foamable modified polystyrene resin particle comprises modified polystyrene resin particle containing a blowing agent; said modified polystyrene resin particle being prepared by radically polymerizing a monomer mixture of a conjugated diene monomer and other monomer in the presence of a radical initiator in the polystyrene resin particle to form rubber particles of the conjugated diene polymer having a particle size of not more than 0.2 μm which are dispersed uniformly in the polystyrene resin particle, and subjecting the obtained polystyrene resin particle containing the rubber particles to impregnation polymerization of a styrene monomer.

3. Foamable modified polystyrene resin particles, wherein the foamable modified polystyrene resin particle (E) comprises a particle of a modified polystyrene resin (C) containing a blowing agent (D);

said resin (C) comprises conjugated diene polymer rubber particles (B) having a particle size of not more than 0.2 μm which are dispersed uniformly throughout a polystyrene resin (A), said conjugated diene polymer rubber is prepared by radically polymerizing a conjugated diene monomer and other monomer in the presence of a radical initiator, an Izod impact strength of said modified polystyrene resin (C) is from 1 to 5 kg·cm/cm, a fusion rate between expanded particles of a foamed article (F) obtained by expansion-molding said foamable modified polystyrene resin particles (E) is not less than 50%, and a 50% failure height according to falling weight method of the foamed article (F) is from 1.35 to 1.84 when a 50% failure height according to falling weight method of a foamed article (H) prepared by expansion-molding a foamable polystyrene resin particle (G) which comprises the polystyrene resin (A) containing the blowing agent (D) is assumed to be 1.

4. A process for preparing foamable modified polystyrene resin particles comprising:

radically polymerizing a monomer mixture of a conjugated diene monomer and other monomer in the presence of a radical initiator in the polystyrene resin particle to form rubber particles of the conjugated diene polymer having a particle size of not more than 0.2 μm which are dispersed uniformly in the polystyrene resin particle, subjecting the obtained polystyrene resin particle containing the rubber particles to impregnation polymerization of a styrene monomer to give a modified polystyrene resin particle, and impregnating the obtained modified polystyrene resin particle with a blowing agent.

5. A foamed article of a modified polystyrene resin which has a cell membrane of the modified polystyrene resin comprising a polystyrene resin and conjugated diene polymer having a particle size of not more than 0.2 μm which are dispersed uniformly in the polystyrene resin, wherein a fusion rate is not less than 50% and the rubber particles substantially maintain their spherical form in the cell membrane.

6. A foamed article of a modified polystyrene resin which is obtained by expansion-molding the foamable modified polystyrene resin particles of claim 1.

7. A process for preparing a foamed article of a modified polystyrene resin, which comprises expansion-molding the foamable modified polystyrene resin particles of claim 1.

8. The foamable modified polystyrene resin particles of claims 1, wherein the polystyrene resin particle contains 0.001 to 1.0% by weight of a nucleating agent and a concentration of the nucleating agent in the surface neighborhood of the polystyrene resin particle is lower than that of the nucleating agent in the inside portion of the polystyrene resin particle.

9. The process of claim 4 for preparing the foamable modified polystyrene resin particles, wherein the polystyrene resin particles are prepared by suspending polystyrene resin seed particles in an aqueous dispersion medium, adding a styrene monomer in the aqueous dispersion medium continuously or intermittently and polymerizing with impregnating the seed particles with the styrene monomer; characterized in that a whole or a part of 0.001 to 1 part of the nucleating agent to be contained in 100 parts by weight of the finally obtained polystyrene resin particles is present in the seed particles at a stage prior to addition of the styrene monomer.

10. A foamed article of a modified polystyrene resin which is obtained by expansion-molding the foamable modified polystyrene resin particles of claim 2.

11. A foamed article of a modified polystyrene resin which is obtained by expansion-molding the foamable modified polystyrene resin particles of claim 3.

12. A process for preparing a foamed article of a modified polystyrene resin, which comprises expansion-molding the foamable modified polystyrene resin particles of claim 2.

13. A process for preparing a foamed article of a modified polystyrene resin, which comprises expansion-molding the foamable modified polystyrene resin particles of claim 3.

14. The foamable modified polystyrene resin particles of claim 2, wherein the polystyrene resin particle contains 0.001 to 1.0% by weight of a nucleating agent and a concentration of the nucleating agent in the surface neighborhood of the polystyrene resin particle is lower than that of the nucleating agent in the inside portion of the polystyrene resin particle.

15. The foamable modified polystyrene resin particles of claim 3, wherein the polystyrene resin particle contains 0.001 to 1.0% by weight of a nucleating agent and a concentration of the nucleating agent in the surface neighborhood of the polystyrene resin particle is lower than that of the nucleating agent in the inside portion of the polystyrene resin particle.

* * * * *